United States Patent
Purvines et al.

(10) Patent No.: US 7,100,889 B2
(45) Date of Patent: Sep. 5, 2006

(54) MINIATURE ELECTRICALLY OPERATED SOLENOID VALVE

(75) Inventors: Stephen H. Purvines, Mishawaka, IN (US); Steve Gettinger, Roann, IN (US); Brad Callis, Greentown, IN (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/877,173

(22) Filed: Jun. 25, 2004

(65) Prior Publication Data
US 2005/0133752 A1    Jun. 23, 2005

Related U.S. Application Data

(60) Provisional application No. 60/530,569, filed on Dec. 18, 2003.

(51) Int. Cl.
*F16K 31/02*    (2006.01)
(52) U.S. Cl. .................................. 251/129.15
(58) Field of Classification Search ............ 251/129.15
See application file for complete search history.

(56) References Cited

U.S. PATENT DOCUMENTS

| | | | |
|---|---|---|---|
| 3,963,048 A | 6/1976 | Bowman | |
| 4,018,419 A | 4/1977 | Monpetit | |
| 4,475,711 A * | 10/1984 | Rountry ....................... | 251/85 |
| 4,509,716 A | 4/1985 | Barber et al. | |
| 4,531,547 A | 7/1985 | Hadden | |
| 4,552,179 A | 11/1985 | Tarusawa et al. | |
| 4,643,359 A | 2/1987 | Casey | |
| 4,717,116 A * | 1/1988 | Ishigaki ................... | 251/30.02 |
| 4,739,966 A | 4/1988 | Lepine et al. | |
| 4,913,399 A | 4/1990 | Migliori | |
| 5,235,303 A | 8/1993 | Xiao | |
| 5,251,659 A | 10/1993 | Sturman et al. | |
| 5,304,971 A | 4/1994 | Sturman et al. | |
| 5,356,111 A | 10/1994 | Bottacini | |
| 5,443,093 A * | 8/1995 | Stoll et al. ............. | 137/596.17 |
| 5,681,024 A | 10/1997 | Lisec et al. | |
| 6,062,256 A | 5/2000 | Miller et al. | |
| 6,086,042 A | 7/2000 | Scott et al. | |
| 6,328,279 B1 | 12/2001 | Adkins et al. | |
| 6,450,198 B1 | 9/2002 | Bouteille et al. | |
| 6,527,003 B1 | 3/2003 | Webster | |
| 6,966,337 B1 * | 11/2005 | Hesser et al. .......... | 137/625.65 |
| 2002/0057153 A1 * | 5/2002 | Matsusaka et al. ......... | 335/220 |
| 2004/0232373 A1 * | 11/2004 | Sonoda et al. ......... | 251/129.15 |

* cited by examiner

*Primary Examiner*—J. Casimer Jacyna
(74) *Attorney, Agent, or Firm*—Krieg DeVault LLP

(57) ABSTRACT

A miniature solenoid valve including a housing defining an axial passage with a valve seat formed integral with the housing and including a minute flow orifice in fluidic communication with the axial passage. A magnetic actuator is positioned within the axial passage and is adapted for reciprocating movement along an actuation axis. A valve element is engagable with the integrally formed valve seat to substantially prevent flow through the minute flow orifice in response to displacement of the magnetic actuator along the actuation axis. In another embodiment, a connection element is formed integral with the housing and is configured for sealing engagement with a pressurized flow source to supply flow to the flow orifice. In a further embodiment, the housing defines a closed end and an open end, with a pole piece engaged with the valve housing and including a transverse portion covering the open end of the valve housing.

48 Claims, 3 Drawing Sheets

ND ELECTRICALLY OPERATED
MINIATURE ELECTRICALLY OPERATED SOLENOID VALVE

CROSS REFERENCE TO RELATED APPLICATIONS

The present application claims the benefit of Provisional Application Ser. No. 60/530,569 filed on Dec. 18, 2003, the contents of which are hereby incorporated by reference in their entirety.

FIELD OF THE INVENTION

The present invention relates generally to the field of electrically operated solenoid valves, and more particularly relates to a miniature electrically operated solenoid valve.

BACKGROUND OF THE INVENTION

Electrically operated solenoid valves are used in a wide variety of automotive and industrial applications to control the flow of a gas or fluid. An electrically operated solenoid valve is generally comprised of an electrical coil which, when energized, produces an electromagnetic field that is utilized to perform some function. In the case of a solenoid valve actuator, the electromagnetic field is utilized to displace an actuator member along an actuation axis. The actuator member is in turn operatively engaged with a valve mechanism such that axial displacement of the actuator member correspondingly engages/disengages a portion of the valve mechanism to control the flow of a gas or fluid therethrough.

In some instances, the use of electrically operated solenoids is desired to control minute flow volumes of gases or fluids. However, precise and accurate control of minute quantities of fluid volumes is difficult to achieve. Additionally, controlling minute flow volumes requires the use of relatively small solenoid and valve components. Manufacture miniature solenoid valve components and assembling such components into a physically small package can be both expensive and time consuming.

Thus, there is a general need in the industry to provide an improved miniature electrically operated solenoid valve. The present invention meets this need and provides other benefits and advantages in a novel and unobvious manner.

SUMMARY OF THE INVENTION

The present invention relates generally to a miniature electrically operated solenoid valve for controlling minute flow volumes of gases or fluids. While the actual nature of the invention covered herein can only be determined with reference to the claims appended hereto, certain forms of the invention that are characteristic of the preferred embodiments disclosed herein are described briefly as follows.

In one form of the present invention, a miniature electrically operated solenoid valve is provided which includes a valve housing and a valve seat formed integral therewith and defining a minute flow orifice.

In another form of the present invention, a method of forming a miniature electrically operated solenoid valve is provided which includes molding a valve housing with a valve seat formed integral therewith and defining a minute flow orifice.

In another form of the present invention, a miniature electrically operated solenoid valve is provided which includes a valve housing defining an axial passage having a closed end and an open end, and a pole piece engaged with the valve housing and including an axial portion extending along at least a portion of the axial passage and a transverse portion covering the open end of the valve housing.

In another form of the present invention, a miniature electrically operated solenoid valve is provided which includes a valve housing defining a flow orifice, and a connection element formed integral with the valve housing and configured for sealing engagement with a pressurized flow source to supply flow to the flow orifice.

It is one object of the present invention to provide an improved miniature electrically operated solenoid valve.

Further objects, features, advantages, benefits, and further aspects of the present invention will become apparent from the drawings and description contained herein.

DESCRIPTION OF THE ILLUSTRATED EMBODIMENTS

Figure 3:
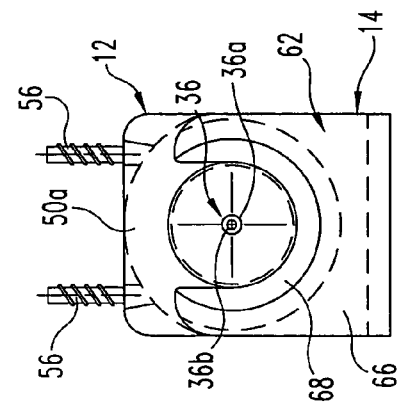
FIG. 3 is a second end view of the solenoid valve illustrated in FIG. 1.
Figure 4:
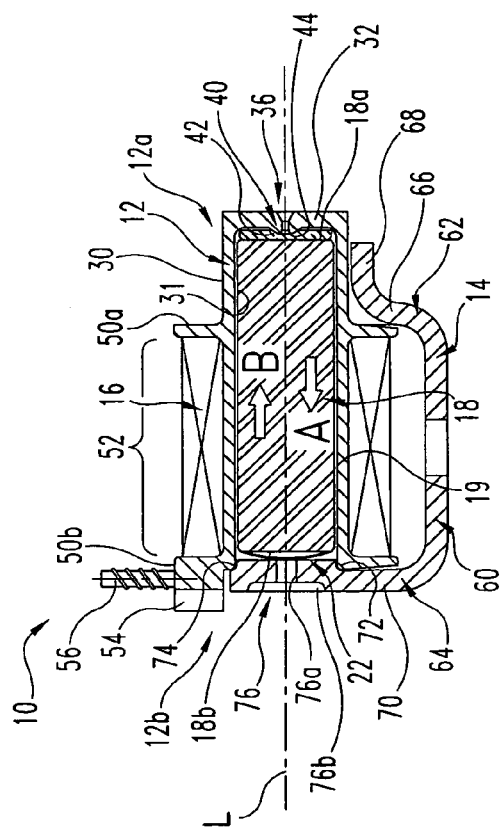
FIG. 4 is a cross-sectional view of the solenoid valve illustrated in FIG. 1.
Figure 1:
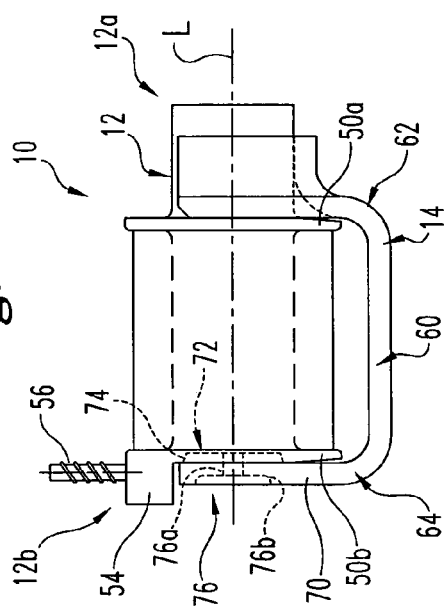
FIG. 1 is side view of a miniature electrically operated solenoid valve according to one form of the present invention.
Figure 2:
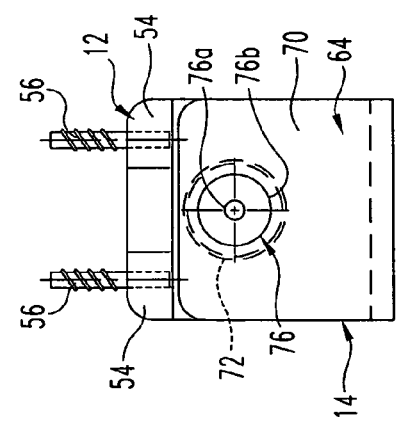
FIG. 2 is a first end view of the solenoid valve illustrated in FIG. 1.

For the purposes of promoting an understanding of the principles of the invention, reference will now be made to the embodiments illustrated in the drawings and specific language will be used to describe the same. It will nevertheless be understood that no limitation of the scope of the invention is hereby intended, such alterations and further modifications in the illustrated devices, and such further applications of the principles of the invention as illustrated herein being contemplated as would normally occur to one skilled in the art to which the invention relates.

Referring to FIGS. 1–5, shown therein is a miniature electrically operated solenoid valve 10 according to one form of the present invention. The solenoid valve 10 extends along a longitudinal axis L and is generally comprised of a housing 12, a pole piece or yoke member 14, an energizing coil 16, an actuator member 18, a valve seal member 20 and a biasing member 22. One or more electrical conductors or leads (not shown) extend from the energizing coil 16 and are electrically connected to a controller or power source (not shown) adapted to electronically control operation of the solenoid valve 10, the details of which would be apparent to one of skill-in the art and therefore need not be discussed herein. The solenoid valve 10 may be operated via a conventional power source and/or via battery power.

As will be discussed in greater detail below, the biasing member 22 exerts an axial biasing force against the actuator member 18 which in turn compresses the valve seal member 20 against a valve seat (formed integral with the housing 12) to hold the solenoid valve 10 in a normally closed position.

However, activation of the energizing coil 16 exerts a magnetic force onto the actuator member 18 to overcome the biasing force exerted by the biasing member 22 which in turn pulls the valve seal member 20 away from the valve seat to switch the solenoid valve 10 to an open position. Further details regarding the operation of the solenoid valve 10 will be described in greater detail below.

The housing 12 has a proximal end portion 12a and a distal end portion 12b and is preferably formed of a non-magnetic material including, for example, a plastic or polymeric material such as a virgin Nylon material, or any other non-magnetic material that would occur to one of skill in the art. In one embodiment of the invention, the housing 12 is formed via a molding process, as disclosed in U.S. Pat. No. 6,086,042 to Scott et al., the contents of which are hereby incorporated by reference in their entirety. In the illustrated embodiment of the invention, the housing 12 includes a generally cylindrical side wall 30 defining an inner surface 31 and a proximal end wall 32, with the side wall 30 and the end wall 32 cooperating to define an interior region or axial passage 34 (FIG. 5) having an open distal end 35 (FIG. 5).

A flow orifice 36 extends through the proximal end wall 32 in communication with the axial passage 34. A pressurized gas or fluid source (not show) is positioned in communication with the flow orifice 36 to provide gas or fluid flow through the flow orifice 36 and into the axial passage 34. As will be discussed in greater detail below, in one embodiment of the invention, the solenoid valve 10 includes an integral connection portion that provides for sealing engagement between the valve housing 12 and a pressurized gas/fluid source. However, it should be understood that other types of connections between the gas/fluid source and the valve housing 12 are also contemplated including, for example, a threaded connection, a quick disconnect connection, a bayonet-type connection, or any other suitable means for connecting a pressurized gas/fluid source and the valve housing 12.

Figure 5:
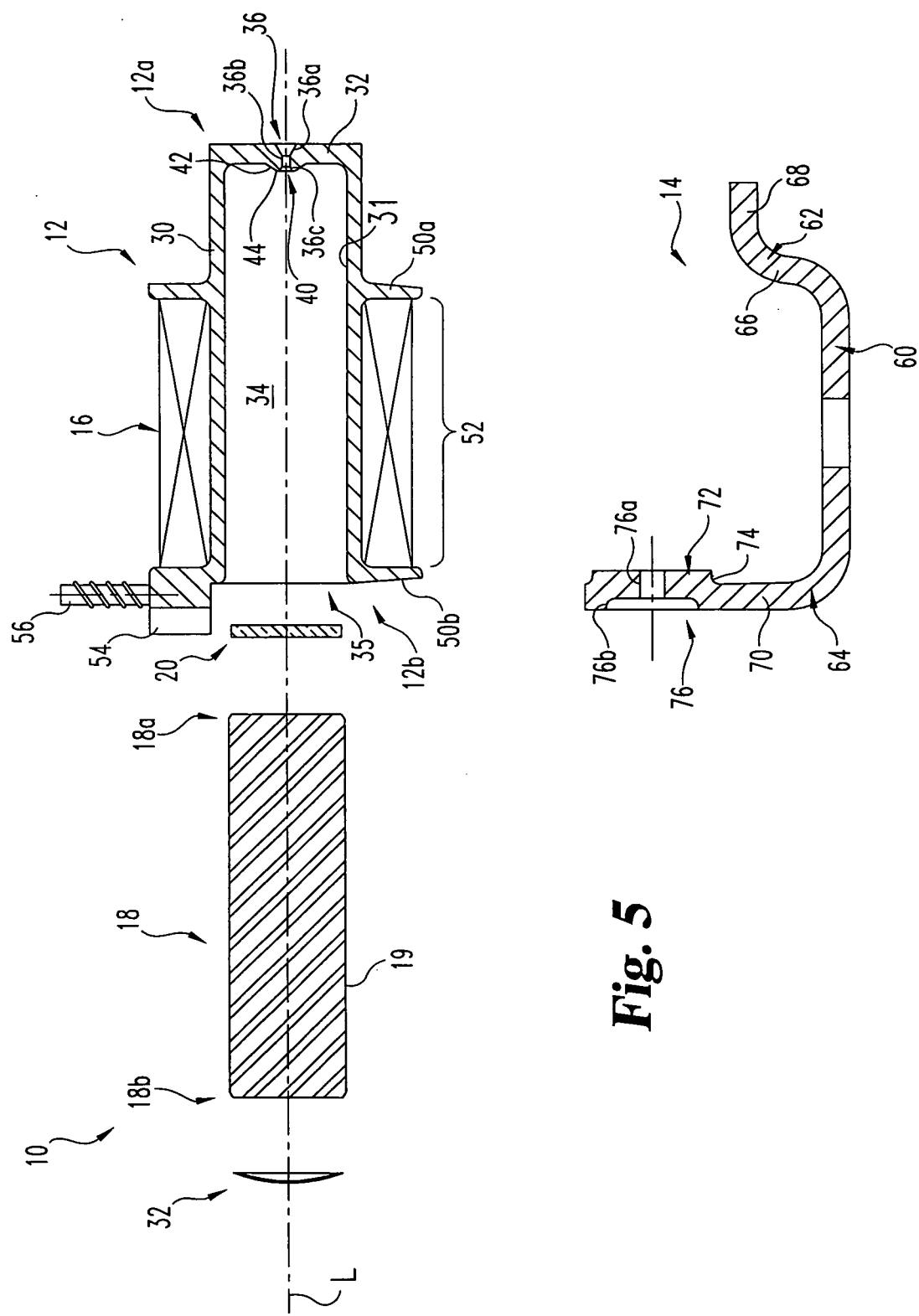
FIG. 5 is an exploded cross-sectional view of the solenoid valve illustrated in FIG. 4.

As shown in FIG. 5, the flow orifice 36 includes an inwardly tapered inlet portion 36a extending from the outer surface of the end wall 32, an axial portion 36b extending through the end wall 32, and an outwardly tapered portion 36c extending to the inner surface of the end wall 32. In one embodiment of the invention, the axial portion 36b of the flow orifice 36 has a diameter of less than about 0.025 inches. In another embodiment, the axial portion 36b of the flow orifice 36 has a diameter of less than about 0.011 inches. In a specific embodiment, the axial portion 36b of the flow orifice 36 has a diameter of about 0.010 inches. In another specific embodiment, the axial portion 36b of the flow orifice 36 has a diameter of about 0.004 inches. It should be understood that other specific embodiments are also contemplated wherein the axial portion 36b of the flow orifice 36 has other select sizes. It should also be understood that providing the flow orifice 36 with a particular size and/or configuration controls the amount of gas/fluid passing therethrough and entering into and through the solenoid valve 10.

The inner surface of the end wall 32 includes a raised central portion or protrusion 40 extending into the axial passage 34 of the housing 12 and with the flow orifice 36 extending therethrough. In a preferred embodiment of the invention, the protrusion 40 is formed integral with the end wall 32 of the housing 12. In the illustrated embodiment, the raised central portion 40 includes an inwardly tapered annular side surface 42 and a relatively flat end surface 44, with the flow orifice 36 opening onto the flat end surface 44. As will be discussed below, the central protrusion 40 serves as a valve seat and the flat end surface 44 as a valve seat face against which the valve seal member 20 is engaged to prevent flow through the flow orifice 36.

The housing 12 also includes a pair of annular ribs or flanges 50a, 50b extending outwardly from the side wall 30 and defining a bobbin portion 52 for receiving the energizing coil 16. The annular flange 50b includes a pair of anchor portions 54 for anchoring a corresponding pair of engaging members 56 to the housing 12. In the illustrated embodiment, the anchor members 56 are threaded studs or posts that are formed integral with the housing 12 and adapted for engaging the solenoid valve 10 to another structure or a substrate. However, other configurations are also contemplated. The energizing coil 16 is comprised of an electrically conductive wire wound about the bobbin portion 52 of the housing 12 between the annular flanges 50a, 50b. In one embodiment, the energizing coil 16 is formed of copper wire. However, other types of wire are also contemplated for use in association with the present invention. One or more electrical terminals or lead supports (not shown) may be provided to connect electrical lead wires to the energizing coil 16.

The pole piece or yoke member 14 is formed of a magnetically responsive material, such as, for example, a soft magnetic steel material, low carbon steel, cold rolled steel, stainless steel, or any other magnetically responsive material that would occur to one of skill in the art. In the illustrated embodiment of the invention, the pole piece member 14 also serves as the support frame for the solenoid valve 10 and is generally configured as a U-shaped bracket having a central portion 60, a proximal portion 62 and a distal portion 64. Although a particular embodiment of the pole piece member 14 has been illustrated and described herein, it should be understood that other types and configurations of pole pieces are also contemplated as falling within the scope of the present invention.

The central portion 60 of the pole piece member 14 runs axially along the length of the bobbin portion 52 of the housing 12 and the energizing coil 16. The proximal portion 62 includes a transverse flange 66 extending generally along the bobbin flange 50a and an annular collar 68 at least partially surrounding the proximal portion of the housing 12. The distal portion 64 includes a transverse flange 70 extending generally along the bobbin flange 50b and a cap member or disc-shaped protrusion 72 extending axially from the transverse flange 70 in proximal direction. The disc-shaped protrusion 72 is sized and shaped for insertion into the distal portion of the axial passage 34 in the housing 12 to close off the open distal end 35. The protrusion 72 includes an inwardly tapered annular side wall 74 to facilitate insertion of the protrusion 72 into the distal portion of the axial passage 34 and to aid in sealing off the open distal end 35.

A vent opening 76 extends through the transverse flange 70 and the disc-shaped protrusion 72 in communication with the axial passage 34. The vent opening 76 is positioned generally along the longitudinal axis L and includes an axial portion 76a extending from the inner surface of the protrusion 72 and a countersunk portion 76b extending from the outer surface of the transverse flange 70. The vent opening 76 serves to provide a flow path for gas or fluid exiting the solenoid valve 10. Although a specific configuration of the vent opening 76 has been illustrated and described herein, it should be understood that other shapes, sizes and/or configurations of the vent opening 76 are also contemplated as falling within the scope of the present invention. It should also be understood that by varying the shape, size and/or configuration of the vent opening 76, different types of spray or flow patterns may be produced to satisfy the particular requirements of the solenoid valve 10. For example, in some applications of the solenoid valve 10, a concentrated flow stream or jet may be desired. In other applications, a dispersed flow stream or mist may be desired. As should be appreciated, varying the parameters associated with the vent opening 76 can be used to produce a particular flow or spray pattern exiting the solenoid valve 10.

As should also be appreciated, the pole piece member 14 comprises an integrated structure that serves multiple functions including, for example, use as a component in the magnetic circuit, as a frame member to provide structural support to the solenoid valve 10, and as a cap member to seal off the open distal end 35 of the housing 12. As should also be appreciated, the use of a single piece structure to perform multiple functions tends to reduce manufacturing and assembly costs, particularly when dealing with miniature components. Initially, the seal member 18, the plunger 18 and the biasing member 22 are all inserted within the axial passage 30 of the housing 12. Additionally, the pole piece member 14 is assembled with the housing 12 by aligning the bobbin portion 52 of the housing 12 between the transverse flanges 66, 70 and transversely displacing the pole piece 14 until the axial protrusion 72 snaps into the open distal end 35 of the axial passage 34 and the annular collar 68 is positioned about the proximal portion of the housing 12. Although the pole piece member 14 is configured to self-engage the housing 12, it should be understood that the pole piece member 14 may be secured to the housing 12 via various means for attachment including, for example, fasteners, pins, an adhesive, or any other suitable method of attachment.

The actuator member 18 is formed of a magnetically responsive material, such as, for example, a soft magnetic steel material, cold rolled steel, low carbon steel, stainless steel, or any other magnetically responsive material that would occur to one of skill in the art. In one embodiment of the invention, the actuator member 18 comprises a magnetic plunger 18 disposed within the axial passage 34 of the housing 12 and adapted for reciprocating axial movement therein. However, it should be understood that other types and configurations of actuator members are also contemplated as falling within the scope of the present invention. In the illustrated embodiment, the plunger 18 has a generally circular outer cross section that correspond to the size and shape to the inner cross section of the axial passage 34. In this manner, the plunger 18 may be operatively guided along the axial passage 34. It should be understood, however, that other shapes and configurations of the plunger 18 are also contemplated, including, for example, a rectangular configuration, a hexagonal configuration, or any other configuration that would occur to one of skill in the art.

In one embodiment of the invention, the clearance between the outer surface 19 of the plunger 18 and the inner surface 31 of the housing side wall 30 provides a circumferential passageway extending along the longitudinal axis L for conveying fluid flow from the inlet flow orifice 36 to the vent opening 76. However, in an alternative embodiment, the plunger 18 may be provided with a hexagonal outer cross section so as to form a number of axially-extending fluid flow passageways between the outer surface of the plunger and the inner surface 31 of the housing side wall 30. In another alternative embodiment, the plunger may define a number of fluid channels broached or notched into the exterior surface of the plunger and extending axially along the longitudinal axis L. In yet another alternative embodiment, the plunger may define a number of fluid passages extending axially through an interior portion of the plunger. Other configurations of flow passages or channels defined by the plunger 18 and/or the housing side wall 30 are also contemplated as would occur to one of ordinary skill in the art for conveying fluid flow from the inlet flow orifice 36 to the vent opening 76.

As should be appreciated, activation of the energizing coil 16 generates an electromagnetic force which is exerted onto the plunger 18 to axially displace the plunger 18 along the passage 34 in the direction of arrow A (away from the valve seat 40) to open the solenoid valve 10. As should also be appreciated, deactivation of the energizing coil 16 removes the electromagnetic force exerted onto the plunger 18 which allows axial displacement of the plunger 18 along the passage 34 in the direction of arrow B (toward the valve seat 40) to close the solenoid valve 10, the details of which will be discussed below. The magnetic plunger 18 is therefore adapted for reciprocating movement along the longitudinal axis L in the direction of arrows A and B to correspondingly open and close the solenoid valve 10.

The valve seat member 20 is positioned between the proximal end 18a of the plunger 18 and the integral valve seat 40. In one embodiment of the invention, the valve seal member 20 comprises a pad of material formed of a resilient material such as, for example, a rubber or polymeric material. In a specific embodiment, the valve seal member 20 is formed of Nitrile (Buna-N). However, it should be understood that the other configurations of valve seal members and/or the use of other types of materials are also contemplated as falling within the scope of the present invention. In one embodiment, the valve seal member 20 is not attached to the proximal end 18a of the plunger 18. Instead, the valve seal member 20 is lifted off of the valve seat 40 via fluid flow pressure when the plunger 18 is displaced in the direction of arrow A upon activation of the energizing coil 16. However, in another embodiment of the invention, the valve seal member 20 may be securely attached to the proximal end 18a of the plunger 18 such as, for example, by an adhesive material or via one or more fasteners.

The biasing member 22 is positioned between the distal end 18b of the plunger 18 and the axial protrusion 72 defined by the distal portion 64 of the pole piece 14. In one embodiment of the invention, the biasing member 22 comprises a spring. In the illustrated embodiment, the biasing member 22 comprises a flat washer-type spring formed of a metallic material such as, for example, stainless steel, cold rolled steel, or any other suitable material that would occur to one of ordinary skill in the art. However, it should be understood that other types and configurations of biasing devices are also contemplated including, for example, an elastically deformable element or other types and configurations of springs including, for example, a coil spring. As should be appreciated, a sufficient amount of clearance is provided between the spring washer 22 and the axial portion 76a of the vent opening 76 to permit fluid flow into and through the vent opening 76. However, other configurations for permitting fluid flow into and through the vent opening 76 are also contemplated such as, for example, providing one or more fluid flow apertures extending through the spring washer 22.

Although not specifically illustrated in FIGS. 1–5, the solenoid valve 10 may be at least partially encased within an encapsulation material to shield and protect the solenoid valve components from the surrounding external environment (e.g., to provide protection against exposure to moisture, contaminants, corrosive substances or other elements which might otherwise adversely affect operation of the solenoid valve 10). Further details regarding encapsulation found in U.S. Pat. No. 6,086,042 to Scott et al, the contents of which have been incorporated herein by reference.

In operation, with the energizing coil 16 de-energized, the biasing member 22 exerts a biasing force onto the plunger 18 in the direction of arrow B to urge the valve seal member 20 into engagement with the valve seat 40 to provide a pressure tight seal therebetween. In this position, the valve seal member 20 engages the valve seal face 44 to seal off and prevent flow through the flow orifice 36. However, when the coil 16 is energized, an electromagnetic force acts upon the plunger 18 to overcome the biasing force of biasing member 22 and displace the plunger 18 in the direction of arrow A. As a result, the valve seal member 20 disengages the valve seat 40 to thereby permit flow through the fluid orifice 36 and into the axial passages 34.

As should be appreciated, fluid flow through the orifice 36 is continued until the coil 16 is de-energized to allow the biasing member 22 to urge the plunger 18 into engagement with the valve seat 44 to once again prevent flow through the flow orifice 36. As should also be appreciated, the quantity of flow through the flow orifice 36 and into the axial passage 30 of the solenoid valve 10 can be accurately and precisely controlled by varying the duration the valve is open (e.g., the period of time in which the valve seal member 20 is displaced from the valve seat 40). As should further be appreciated, very low levels of flow through the solenoid valve 10 are possible due to the uniquely small size of the flow orifice 36. Small flow orifice sizes provide an increased level of flow volume control and more precise and accurate control over the flow. Additionally, the flow volume and flow rate through the solenoid valve can be adjusted via the selection of an appropriately sized flow orifice 36 and/or by varying the time that the solenoid valve remains in the open or activated position. As should further be appreciated, the larger the size of the flow orifice 36, the shorter the time period in which the solenoid valve 10 must remain open to achieve a desired flow volume. Shorter activation time periods result in less energy consumption to drive the solenoid valve 10, thereby possibly resulting in increased battery life if powered in that manner.

Figure 6:
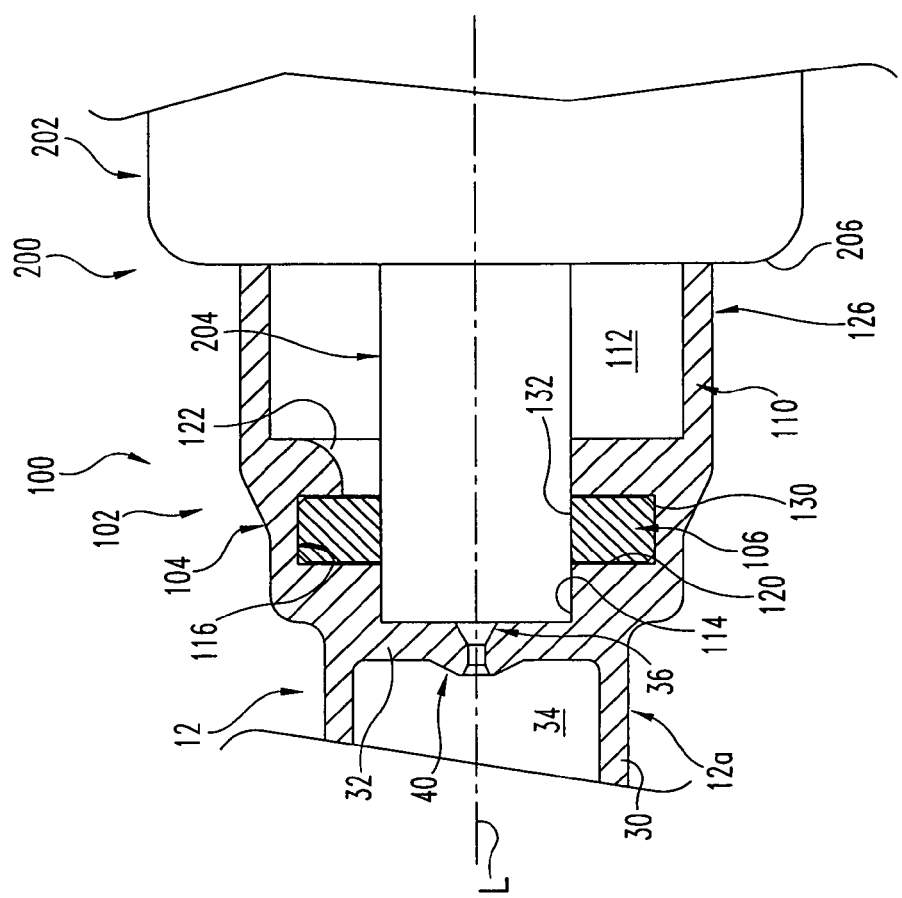
FIG. 6 is a partial cross-sectional view of the proximal end portion of a miniature electrically operated solenoid valve according to another form of the present invention which is adapted for sealing engagement with a pressurized source of gas or fluid.

Referring to FIG. 6, shown therein is the proximal portion of a solenoid valve 100 according to another form of the present invention. The solenoid valve 100 is similar to the solenoid valve 10 illustrated and described above, with like features being designated with the same reference numerals and with the plunger 18 and the valve seal member 20 removed for clarity. However, unlike the solenoid valve 10, the solenoid valve 100 includes a connection portion 102 extending from the proximal end 12a of the valve housing 12 that provides for sealing engagement with a pressurized gas/fluid source 200.

In the illustrated embodiment, the source 200 is configured as a supply canister 202 having a stem portion 204 extending therefrom for delivering a pressurized gas to the solenoid valve 10. The source 200 operates in a manner similar to an aerosol-type can wherein axial displacement of the stem portion 204 toward the canister 202 opens an internal valve mechanism which in turn allows a pressurized gas or fluid to flow from the stem portion 204. However, is should be understood that other types and configuration of gas/fluid sources are also contemplated, and that the scope of the present invention is in no way limited to the type and configuration of gas/fluid source used in association with the present invention.

In the illustrated embodiment of the invention, the connection portion 102 is generally comprised of a boot or sleeve portion 104 and a seal member 106 positioned within the boot portion 104. In one embodiment, the boot portion 104 is formed integral with the valve housing 12. In a specific embodiment, the valve housing 12 and the boot portion 104 are molded together to form a single piece, unitary structure. However, other means for engaging the boot portion 104 with the proximal portion 12a of the housing 12 are also contemplated such as, for example, by threading engagement, by welding or by any other suitable attachment techniques.

In the illustrated embodiment of the invention, the boot portion 104 has a substantially cylindrical configuration including a sidewall 110 defining an axial passage 112. The axial passage 112 includes a stem receiving portion 114 adjacent the valve housing end wall 32 that is sized and shaped to receive the step portion 204 of the air/fluid source 200 therein to properly position the stem portion 204 relative to the inlet flow orifice 36. Although the distal end of the stem portion 204 is shown as abutting the valve housing end wall 32, it should be understood that this is not necessarily required to provide for sealing engagement between the valve housing 12 and the gas/fluid source 200. Additionally, although the stem portion 204 is shown as being snuggly received within the receiving portion 114 of the axial passage 112, it should be understood that this is not necessarily required to provide for sealing engagement between the valve housing 12 and the gas/fluid source 200.

The axial passage 112 also includes a seal receiving portion 116 that is sized and shaped to receive the seal member 106 therein. In the illustrated embodiment, the seal member 106 is retained within a groove formed between an annular shoulder 120 and a retention element 122 in the form of an annular lip or flange extending inwardly into the axial passage 112. However, it should be understood that other means for retaining the seal member 106 within the boot portion 104 are also contemplated such as, for example, by sonic welding, an adhesive, or by any other suitable retaining/securing technique know to those of skill in the art.

In one embodiment, the seal member 106 comprises a pad of material formed of a resilient material such as, for example, a rubber or polymeric material. In a specific embodiment, the seal member 106 is formed of Nitrile (Buna-N). However, it should be understood that the use of other types of materials is also contemplated as falling within the scope of the present invention. In the illustrated embodiment, the seal member 106 has a circular shape defining a central opening therethrough and including an outer surface 130 and an inner surface 132 extending about the central opening. The outer surface 130 has an outer diameter substantially equal to the inner diameter of the seal receiving portion 116 of the axial passage 112. The inner surface 132 has an inner diameter somewhat less than the outer diameter of the stem portion 204 of the fluid source 200. As a result, insertion of the stem portion 204 through the central opening in the seal member 106 results in tight sealing engagement between the seal member 106 and the stem portion 204. Additionally, since the inner diameter of the seal member 106 is less than the outer diameter of the stem portion 204, the wall of the seal member 106 is outwardly deformed to provide for tight sealing engagement between the seal member 106 and the connection portion 102 of the solenoid valve 100.

As discussed above, the gas/fluid source 200 operates in a manner similar to an aerosol-type can wherein axial displacement of the stem portion 204 toward the canister 202 opens an internal valve mechanism (not shown) which allows a pressurized gas or fluid to flow from the stem portion 204 and into the inlet flow orifice 36 of the solenoid valve 100. Sealing engagement between the stem portion 204 and the seal 106 and the seal 106 and the boot portion 104 prevents the escape of pressurized gas or fluid and ensure that all of the gas or fluid is conveyed through the inlet flow orifice 36 upon opening of the solenoid valve 100.

In one embodiment of the invention, the proximal portion 126 of the boot 104 is configured to engage the canister 202 in such a manner as to maintain the internal valve mechanism of the gas/fluid source 200 in an open position to provide a constant supply of pressured gas or fluid to the solenoid valve 100. In the illustrated embodiment, the proximal portion 126 of the boot 104 is positioned in abutment against an alignment surface 206 of the canister 202 to maintain proper alignment of the stem portion 202 relative to the solenoid valve 100 and to maintain the internal valve mechanism in an open position. However, it should be understood that other means for engaging the boot 104 to the canister 202 are also contemplated as would occur to one of ordinary skill in the art, and that a particular interface between the boot 104 and the canister 202 is not essential to practicing the present invention.

As should be appreciated, the unique configuration of the miniature solenoid valve 100 which includes an integral boot portion 104 and seal member 106 provides for a high integrity sealing arrangement with a gas/fluid source. As should also be appreciated, the sealing arrangement provided by the solenoid valve 100 uses a minimal number of components, thereby tending to reduce manufacturing and assembly costs, particularly when dealing with miniature components.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A miniature electrically operated solenoid valve, comprising:
   a molded valve housing including a side wall and an end wall molded integral with said side wall and cooperating to define an axial passage extending generally along an actuation axis;
   an energizing coil positioned about a portion of said integral side wall of said valve housing;
   a valve seat molded into said end wall of said valve housing and including a minute flow orifice in fluidic communication with said axial passage;
   a magnetic actuator positioned within said axial passage of said valve housing and adapted for reciprocating movement along said actuation axis; and
   a valve element engagable with said valve seat to substantially prevent flow through said minute flow orifice in response to displacement of said magnetic actuator along said actuation axis.

2. The solenoid valve of claim 1, wherein a portion of said minute flow orifice has a diameter no greater than about 0.025 inches.

3. The solenoid valve of claim 2, wherein said portion of said minute flow orifice has a diameter no greater than about 0.011 inches.

4. The solenoid valve of claim 3, wherein said portion of said minute flow orifice has a diameter no greater than about 0.004 inches.

5. The solenoid valve of claim 1, wherein said valve seat comprises a raised portion of said valve housing arranged generally along said actuation axis.

6. The solenoid valve of claim 5, wherein said valve element is compressed against said raised portion of said valve housing to substantially prevent flow through said minute flow orifice.

7. The solenoid valve of claim 5, wherein said raised portion of said valve housing includes a substantially planar end surface and a tapered side surface extending about said substantially planar end surface, said flow orifice opening onto said substantially planar end surface.

8. The solenoid valve of claim 5, wherein said raised portion of said valve housing protrudes into said axial passage.

9. The solenoid valve of claim 1, wherein said valve housing includes an end wall defining a surface protrusion positioned generally along said actuation axis and extending into said axial passage, said valve element being compressed against said surface protrusion to substantially prevent flow through said minute flow orifice.

10. The solenoid valve of claim 1, wherein said minute flow orifice is molded directly into said valve housing.

11. The solenoid valve of claim 1, wherein said axial passage of said valve housing defines an open end arranged axially opposite said valve seat; and
   further comprising a cap member positioned to cover said open end of said axial passage.

12. The solenoid valve of claim 11, wherein said cap member defines a vent opening in fluidic communication with said axial passage of said valve housing, said vent opening directing flow from said valve housing upon disengagement of said valve element from said valve seat.

13. The solenoid valve of claim 11, further comprising a pole piece member engaged with said valve housing and including an axial portion extending along at least a portion of said axial passage and a transverse portion positioned adjacent said open end of said axial passage, said transverse portion defining said cap member.

14. The solenoid valve of claim 13, wherein said transverse portion of said cap member includes a protrusion extending through said open end and into said axial passage.

15. The solenoid valve of claim 13, wherein said protrusion includes an inwardly tapered annular side surface to facilitate sealing engagement with said open end of said valve housing.

16. The solenoid valve of claim 1, further comprising a pole piece member configured for self-engagement to said valve housing.

17. The solenoid valve of claim 16, wherein said self-engagement of said pole piece member to said valve housing comprises a snap fit.

18. The solenoid valve of claim 1, wherein said valve element comprises a valve seal member formed of a resilient material.

19. The solenoid valve of claim 18, wherein said valve seal member and said magnetic actuator comprise separate structural elements.

20. The solenoid valve of claim 19, wherein said valve seal member floats relative to said magnetic actuator.

21. The solenoid valve of claim 1, further comprising a biasing member co-acting with said actuator member to urge said actuator member against said valve seat to substantially prevent flow through said minute flow orifice.

22. The solenoid valve of claim 1, further comprising a connection element molded integral with said valve housing and configured for sealing engagement with a pressurized flow source to supply flow to said minute flow orifice.

23. The solenoid valve of claim 22, wherein said connection element comprises a quick-disconnect connection.

24. The solenoid valve of claim 23, wherein said connection element comprises a boot-type connection element configured for non-threaded sealing engagement with said pressurized flow source.

25. A miniature electrically operated solenoid valve, comprising:
   a valve housing defining an axial passage extending generally along an actuation axis;
   a valve seat formed integral with said valve housing and including a minute flow orifice in fluidic communication with said axial passage and in fluidic communication with a pressurized flow source;
   a magnetic actuator positioned within said axial passage of said valve housing and adapted for reciprocating movement along said actuation axis; and
   a valve element engagable with said valve seat to substantially prevent pressurized flow through said minute flow orifice, said valve element disengagable from said valve seat to supply pressurized flow through said minute flow orifice and into said axial passage in response to displacement of said magnetic actuator along said actuation axis; and
   a vent opening in fluidic communication with said axial passage of said valve housing, said vent opening directing said pressurized flow from said valve housing to atmosphere upon disengagement of said valve element from said valve seat.

26. The solenoid valve of claim 25, wherein said vent opening is sized and shaped to provide a predetermined flow pattern exiting said valve housing.

27. The solenoid valve of claim 26, wherein said predetermined flow pattern comprises a narrowly concentrated flow stream.

28. The solenoid valve of claim 26, wherein said predetermined flow pattern comprises a widely dispersed flow stream.

29. The solenoid valve of claim 25, wherein said vent opening is positioned axially opposite said minute flow orifice, said magnetic actuator configured to provide axial flow between said minute flow orifice and said vent opening.

30. The solenoid valve of claim 29, wherein at least one of said magnetic actuator and said valve housing defines an axial passageway for conveying said axial flow between said minute flow orifice and said vent opening.

31. The solenoid valve of claim 30, wherein said magnetic actuator defines an outer cross section sized smaller than an inner cross section of said axial passage of said valve housing to provide said axial passageway for conveying said axial flow between said minute flow orifice and said vent opening.

32. The solenoid valve of claim 31, wherein said outer cross section of said magnetic actuator and said inner cross section of said axial passage are each substantially circular and wherein said axial passageway comprises a circumferential passageway.

33. A miniature electrically operated solenoid valve, comprising:
   a valve housing defining an axial passage extending generally along an actuation axis;
   a valve seat formed integral with said valve housing and including a minute flow orifice in fluidic communication with said axial passage;
   a magnetic actuator positioned within said axial passage of said valve housing and adapted for reciprocating movement along said actuation axis; and
   a valve element engagable with said valve seat to substantially prevent flow through said minute flow orifice in response to displacement of said magnetic actuator along said actuation axis; and
   a biasing member co-acting with said actuator member to urge said actuator member against said valve seat to substantially prevent flow through said minute flow orifice, said biasing member comprises a washer-type spring.

34. A miniature electrically operated solenoid valve, comprising:
   a valve housing defining an axial passage extending generally along an actuation axis, said valve housing defining a closed end and an open end positioned axially opposite said closed end;
   a magnetic actuator positioned within said axial passage of said valve housing and adapted for reciprocating movement along said actuation axis;
   a valve element engagable with a valve seat defining a minute flow orifice to substantially prevent flow through said minute flow orifice in response to displacement of said magnetic actuator along said actuation axis; and
   a pole piece engaged with said valve housing and including an axial portion extending along at least a portion of said axial passage and a transverse portion covering said open end of said valve housing, said transverse portion of said pole piece including a protrusion extending through said open end of said valve housing and into said axial passage to facilitate sealing engagement with said open end of said valve housing.

35. The solenoid valve of claim 34, wherein said transverse portion of said pole piece defines a vent opening in fluidic communication with said axial passage of said valve housing, said vent opening directing flow from said valve housing upon disengagement of said valve element from said valve seat.

36. The solenoid valve of claim 34, wherein said protrusion includes an inwardly tapered annular side surface to facilitate said sealing engagement with said open end of said valve housing.

37. The solenoid valve of claim 34, wherein said valve seat is formed integral with said closed end of said valve housing.

38. A miniature electrically operated solenoid valve, comprising:
   a valve housing defining an axial passage extending generally along an actuation axis and a flow orifice in fluidic communication with said axial passage;
   a connection element formed integral with said valve housing and configured for sealing engagement with a pressurized flow source to supply flow to said flow orifice, said pressurized flow source comprising a pressurized canister;
   a magnetic actuator positioned within said axial passage of said valve housing and adapted for reciprocating movement along said actuation axis; and
   a valve element engagable with a valve seat to substantially prevent flow through said flow orifice in response to displacement of said magnetic actuator along said actuation axis.

39. The solenoid valve of claim 38, wherein said connection element comprises a quick-disconnect connection engagable with said pressurized flow source.

40. The solenoid valve of claim 38, wherein said connection element comprises a boot-type connection element configured for non-threaded engagement with said pressurized flow source.

41. The solenoid valve of claim 38, further comprising a seal member engaged between said connection element and said pressurized flow source to provide for said sealing engagement with said pressurized fluid source.

42. The solenoid valve of claim 38, wherein said valve seat comprises a raised portion of said valve housing arranged generally along said actuation axis and defining said flow orifice, said valve element being compressed against said raised portion of said valve housing to substantially prevent flow through said flow orifice.

43. The solenoid valve of claim 38, wherein said valve housing defines a closed end and an open end positioned axially opposite said closed end; and further comprising a pole piece engaged with said valve housing and including an axial portion extending along at least a portion of said axial passage and a transverse portion covering said open end of said valve housing.

44. A miniature electrically operated solenoid valve, comprising:

a valve housing defining an axial passage extending generally along an actuation axis and a flow orifice in fluidic communication with said axial passage;

a connection element formed integral with said valve housing and configured for sealing engagement with a pressurized flow source to supply flow to said flow orifice;

a seal member engaged between said connection element and said pressurized flow source to provide for said sealing engagement with said pressurized fluid source;

a magnetic actuator positioned within said axial passage of said valve housing and adapted for reciprocating movement along said actuation axis; and a valve element engagable with a valve seat to substantially prevent flow through said flow orifice in response to displacement of said magnetic actuator along said actuation axis; and wherein said pressurized flow source comprises a pressurized canister including a stem portion positioned within an interior region of said seal member to provide for said sealing engagement with said pressurized flow source.

45. The solenoid valve of claim 44, wherein said connection element defines an inner retention groove sized to receive and retain said seal member therein.

46. A miniature electrically operated solenoid valve, comprising:

a valve housing defining an axial passage extending generally along an actuation axis and a flow orifice in fluidic communication with said axial passage;

a connection element formed integral with said valve housing and configured for sealing engagement with a pressurized flow source to supply flow to said flow orifice;

a magnetic actuator positioned within said axial passage of said valve housing and adapted for reciprocating movement along said actuation axis; and a valve element engagable with a valve seat to substantially prevent flow through said flow orifice in response to displacement of said magnetic actuator along said actuation axis; and wherein said pressurized flow source includes a valve mechanism; and wherein engagement of said pressurized flow source with said connection element automatically opens said valve mechanism to supply flow to said flow orifice.

47. A miniature electrically operated solenoid valve, comprising:

a valve housing defining an axial passage extending generally along an actuation axis and a flow orifice in fluidic communication with said axial passage;

a connection element formed integral with said valve housing and configured for sealing engagement with a pressurized flow source to supply flow to said flow orifice;

a magnetic actuator positioned within said axial passage of said valve housing and adapted for reciprocating movement along said actuation axis; and a valve element engagable with a valve seat to substantially prevent flow through said flow orifice in response to displacement of said magnetic actuator along said actuation axis; and wherein said valve housing is formed of a molded material with said connection element molded directly with said valve housing.

48. The solenoid valve of claim 47, wherein said valve seat is molded directly into said valve housing.

* * * * *